US011283070B1

(12) United States Patent
Sadoway et al.

(10) Patent No.: US 11,283,070 B1
(45) Date of Patent: Mar. 22, 2022

(54) ALUMINUM-CHALCOGEN BATTERIES WITH ALKALI HALIDE MOLTEN SALT ELECTROLYTES

(71) Applicant: Massachusetts Institute of Technology, Cambridge, MA (US)

(72) Inventors: Donald R. Sadoway, Cambridge, MA (US); Quanquan Pang, Beijing (CN); Jiashen Meng, Wuhan (CN); Ji Zhao, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/237,943

(22) Filed: Apr. 22, 2021

(51) Int. Cl.
| | |
|---|---|
| *H01M 4/46* | (2006.01) |
| *H01M 10/054* | (2010.01) |
| *H01M 4/58* | (2010.01) |
| *H01M 10/42* | (2006.01) |
| *H01M 10/653* | (2014.01) |
| *H01M 4/02* | (2006.01) |

(52) U.S. Cl.
CPC ......... *H01M 4/463* (2013.01); *H01M 4/5815* (2013.01); *H01M 10/425* (2013.01); *H01M 10/653* (2015.04); *H01M 2004/027* (2013.01); *H01M 2004/028* (2013.01)

(58) Field of Classification Search
CPC .. H01M 4/463; H01M 10/653; H01M 4/5815; H01M 10/425; H01M 2004/027; H01M 2004/028
See application file for complete search history.

(56) References Cited

U.S. PATENT DOCUMENTS

| | | |
|---|---|---|
| 3,554,806 A | 1/1971 | Greenberg et al. |
| 3,573,986 A | 4/1971 | Greenberg |
| 3,751,298 A | 8/1973 | Senderoff |
| 3,770,503 A | 11/1973 | Brabson et al. |
| 3,811,947 A | 5/1974 | Metcalfe et al. |
| 3,827,910 A | 8/1974 | Cairns et al. |
| 3,966,491 A | 6/1976 | Mamantov et al. |
| 4,063,005 A | 12/1977 | Mamantov et al. |
| 4,108,741 A | 8/1978 | Tsumura |
| 4,287,268 A | 9/1981 | Coetzer |
| 4,493,784 A | 1/1985 | Mamantov et al. |

(Continued)

FOREIGN PATENT DOCUMENTS

| | | |
|---|---|---|
| CN | 1302570 C | 2/2007 |
| CN | 102742062 B | 9/2015 |

(Continued)

OTHER PUBLICATIONS

Hussey et al. Chem. Commun., 2018, 54, 4164-4167 (Year: 2018).*

(Continued)

*Primary Examiner* — Lisa S Park
(74) *Attorney, Agent, or Firm* — Smith Baluch LLP (57) ABSTRACT

A rechargeable, self-heating aluminum-chalcogen battery is provided, with an aluminum or aluminum alloy negative electrode, a positive electrode of elemental chalcogen, and a mixture of chloride salts providing a molten salt electrolyte. The predominant chloride salt in the electrolyte is $AlCl_3$. Additional chloride salts are chosen from alkali metal chlorides. The cell operates at a modestly elevated temperatures, ranging from 90° C. to 250° C.

19 Claims, 8 Drawing Sheets

(56) References Cited

U.S. PATENT DOCUMENTS

| | | | |
|---|---|---|---|
| 4,508,795 A | 4/1985 | Mamantov | |
| 5,552,241 A | 9/1996 | Mamantov et al. | |
| 9,065,133 B2 | 6/2015 | Sudworth | |
| 10,128,543 B2 | 11/2018 | Amendola et al. | |
| 10,170,798 B2 | 1/2019 | Gordon et al. | |
| 10,892,487 B2 | 1/2021 | Hambitzer et al. | |
| 2014/0162091 A1* | 6/2014 | Hatta | H01M 10/443 429/50 |
| 2016/0172714 A1* | 6/2016 | Ouchi | H01M 10/399 429/50 |
| 2018/0108909 A1* | 4/2018 | Su | H01M 4/502 |
| 2018/0233747 A1* | 8/2018 | Zhamu | H01M 4/587 |

FOREIGN PATENT DOCUMENTS

| | | |
|---|---|---|
| RU | 2402842 C2 | 10/2010 |
| WO | 2006100464 A2 | 9/2006 |

OTHER PUBLICATIONS

Wang et al. Angew. Chem. Int. Ed., 2016, 55, 9898-9901 (Year: 2016).*

Sato et al., "Surface Tensions of Basic NaCl—AlCl3 and LiCl—AlCl3 Binary Melts." Electrochemistry 67.6 (1999): 563-567.

Schoetz et al., "State of the art of rechargeable aluminium batteries in non-aqueous systems: A perspective." Journal of the Electrochemical Society 164.14 (2017): A3499-A3502.

Song et al., "A long-life rechargeable Al ion battery based on molten salts." Journal of Materials Chemistry A 5.3 (2017): 1282-1291.

Stafford et al., "The electrodeposition of Al—Nb alloys from chloroaluminate electrolytes." Plasmas & Ions 2.1 (1999): 35-44.

Stafford, "The electrodeposition of an aluminum-manganese metallic glass from molten salts." Journal of the Electrochemical Society 136.3 (1989): 635. 6 pages.

Suto et al., "Electrochemical properties of Al/vanadium chloride batteries with AlCl3-1-Ethyl-3-methylimidazolium chloride electrolyte." Journal of the Electrochemical Society 163.5 (2016): A742. 7 pages.

Turcheniuk et al., "Ten years left to redesign lithium-ion batteries." (2018): 467-470.

Vahidmohammadi et al., "Two-dimensional vanadium carbide (MXene) as a high-capacity cathode material for rechargeable aluminum batteries." ACS nano 11.11 (2017): 11135-11144.

Varzi et al., "Current status and future perspectives of lithium metal batteries." Journal of Power Sources 480 (2020):228803. 26 pages.

Wang et al., "A new cathode material for super-valent battery based on aluminium ion intercalation and deintercalation." Scientific Reports 3.3383 (2013): 1. 6 pages.

Wang et al., "A novel aluminum-ion battery: Al/AlCl3-[EMIm]Cl/Ni3S2@ graphene." Advanced Energy Materials 6.13 (2016): 1600137. 10 pages.

Wang et al., "Aluminum Anodization in the Low-Melting LiAlBr4—NaAlCl4-KAlCl4 Molten Salt." ECS Transactions 64.4 (2014): 257. 10 pages.

Wang et al., "Binder-free V2O5 cathode for greener rechargeable aluminum battery." ACS applied materials & Interfaces 7.1 (2015): 80-84.

Wang et al., "High-performance aluminum-ion battery with CuS@ C microsphere composite cathode." ACS nano 11.1 (2017): 469-477.

Wang et al., "High-voltage and noncorrosive ionic liquid electrolyte used in rechargeable aluminum battery." ACS applied materials & interfaces 8.41 (2016): 27444-27448.

Wang et al., "Lithium-antimony-lead liquid metal battery for grid-level energy storage." Nature 514.7522 (2014): 348-350.

Wang et al., "Open-structured V2O5 nH2O nanoflakes as highly reversible cathode material for monovalent and multivalent intercalation batteries." Advanced Energy Materials 7.14 (2017): 1602720. 8 pages.

Wei et al., "Metal-sulfur battery cathodes based on PAN-sulfur composites." Journal of the American Chemical Society 137.37 (2015): 12143-12152.

Xia et al., "Ionic liquid electrolytes for aluminium secondary battery: Influence of organic solvents." Journal of Electroanalytical Chemistry 757 (2015): 167-175.

Yang et al., "An Aluminum-Sulfur Battery with a Fast Kinetic Response." Angew. Chem. Int. Ed 57 (2018): 1898-1902.

Yu et al., "Electrochemical Energy Storage with a Reversible Nonaqueous Room-Temperature Aluminum-Sulfur Chemistry." Advanced Energy Materials 7.18 (2017): 1700561. 9 pages.

Yu et al., "Hexagonal NiS nanobelts as advanced cathode materials for rechargeable Al-ion batteries." Chemical Communications 52.68 (2016): 10427-10430.

Yu et al., "Room-Temperature Aluminum-Sulfur Batteries with a Lithium-Ion-Mediated Ionic Liquid Electrolyte." Chem 4.3 (2018). 14 pages.

Zhang et al., "Emerging nonaqueous aluminum-ion batteries: challenges, status, and perspectives." Advanced Materials 30.38 (2018): 1706310. 23 pages.

Zhang et al., "Porous CuO microsphere architectures as high-performance cathode materials for aluminum-ion batteries." Journal of Materials Chemistry A 6.7 (2018): 3084-3090.

Akdeniz et al., "An ionic model for molecular units in molten aluminium trichloride and alkali chloroaluminates." Physics and Chemistry of Liquids 32.4 (1996): 191-209.

Berg et al., "Rechargeable batteries: grasping for the limits of chemistry." Journal of The Electrochemical Society 162.14 (2015): A2468. 9 pages.

Berrettoni et al., "A cyclic voltammetric study of the electrochemical behavior of NiS2 in molten NaCl saturated NaAlCl4 melts." Journal of the Electrochemical Society 140.4 (1993): 969. 6 pages.

Boston, "Densities of Molten AlCl3 and NaCl—AlCl3 Mixtures." Journal of Chemical and Engineering Data 11.2 (1966): 262-263.

Boxall et al., "Solvent Equilibria of AlCl3—NaCl Melts." Journal of the Electrochemical Society 120.2 (1973): 223. 10 pages.

Broux et al., "VIV disproportionation upon sodium extraction from Na3V2 (PO4) 2F3 observed by operando X-ray absorption spectroscopy and solid-state NMR." The Journal of Physical Chemistry C 121.8 (2017): 4103-4111.

Chai et al., "Long-range corrected hybrid density functionals with damped atom-atom dispersion corrections." Physical Chemistry Chemical Physics 10.44 (2008): 6615-6620.

Chen et al., "Ultrafast all-climate aluminum-graphene battery with quarter-million cycle life." Science advances 3.12 (2017): eaao7233. 9 pages.

Chen et al., Opportunities and challenges of high-energy lithium metal batteries for electric vehicle applications. ACS Energy Lett. 5, 3140-3151 (2020).

Chiku et al., "Aluminum bis (trifluoromethanesulfonyl) imide as a chloride-free electrolyte for rechargeable aluminum batteries." Journal of The Electrochemical Society 164.9 (2017): A1841. 5 pages.

Chiku et al.,"Amorphous vanadium oxide/carbon composite positive electrode for rechargeable aluminum battery." ACS applied materials & interfaces 7.44 (2015): 24385-24389.

Chu et al., "A low-cost deep eutectic solvent electrolyte for rechargeable aluminum-sulfur battery." Energy Storage Materials 22 (2019): 418-423.

Cohn et al., "A novel non-aqueous aluminum sulfur battery." Journal of Power Sources 283 (2015): 416-422.

Cui et al., "(De) Lithiation mechanism of Li/SeS x (x=0-7) batteries determined by in situ synchrotron X-ray diffraction and X-ray absorption spectroscopy." Journal of the American chemical society 135.21 (2013): 8047-8056.

Cuisinier et al., "Sulfur speciation in Li—S batteries determined by operando X-ray absorption spectroscopy." The Journal of Physical Chemistry Letters 4.19 (2013): 3227-3232.

De Juan et al., "Chemometrics applied to unravel multicomponent processes and mixtures: Revisiting latest trends in multivariate resolution." Analytica Chimica Acta 500.1-2 (2003): 195-210.

(56) References Cited

OTHER PUBLICATIONS

Eroglu et al., "Critical link between materials chemistry and cell-level design for high energy density and low cost lithium-sulfur transportation battery." Journal of The Electrochemical Society 162.6 (2015): A982. 10 pages.
Gao et al., "Effects of liquid electrolytes on the charge-discharge performance of rechargeable lithium/sulfur batteries: electrochemical and in-situ X-ray absorption spectroscopic studies." The Journal of Physical Chemistry C 115.50 (2011): 25132-25137.
Geng et al., "Reversible electrochemical intercalation of aluminum in Mo6S8." Chemistry of Materials 27.14 (2015): 4926-4929.
Geng et al., "Titanium sulfides as intercalation-type cathode materials for rechargeable aluminum batteries." ACS applied materials & interfaces 9.25 (2017): 21251-21257.
Giner et al., Aluminum chlorine battery. vol. 1541. National Aeronautics and Space Administration, 1970. 64 pages.
Griffith et al., "Niobium tungsten oxides for high-rate lithium-ion energy storage." Nature 559.7715 (2018): 556-563.
Grjotheim et al., "Some problems concerning aluminium electroplating in molten salts." Acta chemica scandinavica 34.9 (1980): 666-670.
Guo et al., "Carbonized-MOF as a Sulfur Host for Aluminum-Sulfur Batteries with Enhanced Capacity and Cycling Life." Advanced Functional Materials 29.7 (2019): 1807676. 6 pages.
Harl et al., "Assessing the quality of the random phase approximation for lattice constants and atomization energies of solids." Physical Review B 81.11 (2010): 115126. 18 pages.
Heerman et al., "Potentiometric study of the solvent equilibria in aluminum trichloride-Nn-butylpyridinium chloride melts." Inorganic chemistry 24.26 (1985): 4704-4707.
Howie et al., "The electrodeposition of aluminium from molten aluminium chloride/sodium chloride." Journal of Applied Electrochemistry 2.3 (1972): 217-222.
Hu et al., "A binder-free and free-standing cobalt sulfide@ carbon nanotube cathode material for aluminum-ion batteries." Advanced Materials 30.2 (2018): 1703824. 6 pages.
Hu et al., "A rechargeable aqueous aluminum-sulfur battery through acid activation in water-in-salt electrolyte." Chemical Communications 56.13 (2020): 2023-2026.
Hu et al., "An innovative freeze-dried reduced graphene oxide supported SnS2 cathode active material for aluminum-ion batteries." Advanced Materials 29.48 (2017): 1606132. 6 pages.
Jayaprakash et al., "The rechargeable aluminum-ion battery." Chemical Communications 47.47 (2011): 12610-12612.
Kendall et al., "A study of the factors influencing compound formation and solubility in fused salt mixtures1" Journal of the American Chemical Society 45.4 (1923): 963-996.
Kim et al., "Rechargeable aluminium organic batteries." Nature Energy 4.1 (2019): 51-59.

Knutz et al., "Mechanism of Reaction in NaAlCl4 Molten Salt Batteries with Nickel Felt Cathodes and Aluminum Anodes: II. Experimental Results and Comparison with Model Calculations." Journal of the Electrochemical Society 140.12 (1993): 3380. 12 pages.
Koketsu et al., "Reversible magnesium and aluminium ions insertion in cation-deficient anatase TiO 2." Nature materials 16.11 (2017): 1142-1148.
Koura, "A Preliminary Investigation for an Al/AlCl 3—NaCl/FeS 2 Secondary Cell." Journal of the Electrochemical Society 127.7 (1980): 1529. 4 pages.
Kresse et al., "Efficient iterative schemes for ab initio total-energy calculations using a plane-wave basis set." Physical review B 54.16 (1996): 11169. 18 pages.
Kresse et al., "From ultrasoft pseudopotentials to the projector augmented-wave method." Physical review b 59.3 (1999): 1758. 18 pages.
Li et al., "Reversible aluminum-ion intercalation in Prussian blue analogs and demonstration of a high-power aluminum-ion asymmetric capacitor." Advanced Energy Materials 5.5 (2015): 1401410. 6 pages.
Liao et al., "A techno-economic analysis on NaS battery energy storage system supporting peak shaving." International journal of energy research 40.2 (2016): 241-247.
Lin et al., "An ultrafast rechargeable aluminium-ion battery." Nature 520.7547 (2015): 324-328.
Lu et al., "Experimental measurement and thermodynamic optimization of the phase diagram of LiCl—NaCl—KCl system." Chinese Science Bulletin 65.7 (2019): 641-648.
Matiašovský et al., "Density and electrical conductivity of molten NaCl—KCl—AlCl3 mixtures." Electrochimica Acta 25.2 (1980): 195-200.
Nayak et al., "The electrodeposition of aluminium on brass from a molten aluminium chloride-sodium chloride bath." Journal of Applied Electrochemistry 7.1 (1977): 45-50.
Nelson et al., Modeling the Performance and Cost of Lithium-Ion Batteries for Electric-Drive Vehicles, Third Edition. United States: N. p., 2019. Web. doi:10.2172/1503280 (2019). 140 pages.
Peramunage et al., "A solid sulfur cathode for aqueous batteries." Science 261.5124 (1993): 1029-1032.
Perdew et al., "Generalized gradient approximation made simple." Physical review letters 77.18 (1996): 3865. 4 pages.
Ravel et al., "Athena, Artemis, Hephaestus: data analysis for X-ray absorption spectroscopy using IFEFFIT." Journal of synchrotron radiation 12.4 (2005): 537-541.
Reed et al., "A rechargeable aluminum-ion battery utilizing a copper hexacyanoferrate cathode in an organic electrolyte." Chemical Communications 51.76 (2015): 14397-14400.
Salanne et al., "From molten salts to room temperature ionic liquids: Simulation studies on chloroaluminate systems." Faraday discussions 154 (2012): 171-188.

\* cited by examiner

ALUMINUM-CHALCOGEN BATTERIES WITH ALKALI HALIDE MOLTEN SALT ELECTROLYTES

TECHNICAL FIELD

The present invention relates to rechargeable batteries using aluminum metal as the anode during discharge. In particular, the present invention relates to low-cost, rapidly rechargeable batteries that can be charged and recharged over multiple cycles.

BACKGROUND ART

Cheap and efficient electrical energy storage is essential for reducing our dependence on fossil fuels. Lithium-ion batteries dominate in applications for portable electronic devices and electric vehicles due to their relatively high energy density and a well-established marketplace. However, factors including cost, safety and energy density limit their long-term and large-scale applications. As demand for batteries grows, limitations on the global supply of lithium portend dramatic price increases. Because of their reliance on flammable organic electrolytes, lithium-ion batteries pose a significant safety concern as electric vehicles gain increased market share. Finally, the energy density of lithium-ion batteries is approaching a limit rooted in the underlying intercalation chemistry. Consequently, inexpensive and efficient batteries are desired based on abundant and renewable natural resources.

Aluminum is the most abundant metal, and the third most abundant element of the earth's crust, and with its low atomic weight and ability to give up three electrons, has significant intrinsic potential for use in electrochemical storage. However, operation of a rechargeable aluminum metal battery requires the fully reversible transfer of three electrons between aluminum acting as an electrode and an aluminum ion in the molten salt electrolyte.

SUMMARY OF THE EMBODIMENTS

Embodiments of an aluminum-chalcogen cell, that use molten salts at modestly elevated temperatures, have superior reaction kinetics and reversibility compared to those of previously described aluminum-chalcogen cells that operate at room temperature thanks to the use of expensive ionic liquids with large organic cations and halide anions which serve as the electrolyte. From a safety perspective, due to the absence of a flammable organic electrolyte as is found in lithium-ion batteries, embodiments fitted with molten salt electrolytes offer non-flammability and high thermal tolerance. In contrast to lithium-ion batteries, which require continuous monitoring and cooling to prevent potentially dangerous overheating, no cooling system is required for operation of embodiments of the present battery. Rather, during normal operation, the Joule heat generated internally from the battery can be trapped as needed by appropriate insulation to keep the battery operating at an optimal, modestly elevated operating temperature with no need for external heating or cooling. The chalcogen positive electrode also offers much higher specific capacity than previously reported graphite electrodes that function by $AlCl_4^-$ intercalation. In an embodiment of the instant invention, a system utilizing liquid sulfur accommodated in porous carbon as a positive electrode, a molten salt solution of sodium chloride and aluminum chloride as an electrolyte, and aluminum foil as a negative electrode exhibits a high capacity (400 mAh $g^{-1}$) and ~200 cycles of full depth of discharge with minimal loss of storage capacity.

In accordance with one embodiment of the invention, a rechargeable, self-heating aluminum-chalcogen battery is provided, the battery including:

(a) an aluminum or aluminum alloy negative electrode;

(b) a positive electrode comprising elemental chalcogen having an oxidation state of zero, selected from the group consisting of sulfur, selenium, tellurium, and combinations thereof;

(c) an electrolyte that includes a mixture of $AlX_3$ and MX, wherein X is a halide, and M is selected from the group consisting of lithium, sodium, potassium, and combinations thereof, the electrolyte formulated so as to make a molten salt that physically contacts and wets the positive electrode and the negative electrode during operation of the aluminum-chalcogen battery;

(d) a negative current collector in electrical contact with the negative electrode;

(e) a positive current collector in electrical contact with the positive electrode, wherein the molar concentration of $AlX_3$ in the salt mixture is at least 50 mole %, and wherein the melting temperature of the salt mixture is between 70° C. and 140° C.

In some embodiments, the salt mixture includes between 60% and 95% $AlCl_3$ on a molar basis. In some embodiments the salt mixture includes between 80% and 95% $AlCl_3$ on a molar basis. In some embodiments, the cell is constructed so as to require no externally supplied heat during operation.

In some embodiments, the battery further includes insulating material configured to retain Joule heat generated by the battery in order to maintain normal operating temperature.

In some embodiments, the cell is designed with appropriate insulation for operation at a temperature between about 90° C. and about 250° C. In some embodiments, the cell is designed for operation at a temperature between about 90° C. and about 180° C. In some embodiments, the cell is designed for operation at a temperature between about 90° C. and about 150° C. In some embodiments, the cell is designed for operation at a temperature between about 90° C. and about 120° C.

In some embodiments, the elemental chalcogen comprises sulfur. In some embodiments, sulfur is present as a liquid during battery operation. In some embodiments, sulfur is present as a solid during battery operation. In further embodiments, the elemental chalcogen comprises selenium.

In some embodiments, the positive current collector comprises a conductive matrix in contact with the elemental chalcogen. According to some embodiments, the elemental chalcogen is coated as a polymer-containing slurry onto the positive electrode. In some embodiments, the salt mixture includes molar percentages between 60% and 90% $AlCl_3$, between 0% and 30% NaCl and between 0% and 20% KCl.

In some embodiments, a method for generating electric current comprises:

providing the aluminum-chalcogen battery;

connecting the positive current collector and the negative current collector to an external circuit;

applying an external heat source to melt a portion of the electrolyte;

deactivating the external heat source;

discharging the aluminum-chalcogen battery through the external circuit;

allowing Joule heat generated during discharging to melt the remaining electrolyte and to maintain the electrolyte in a molten state without further external heating.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

In accordance with embodiments of the aluminum battery of the instant invention, the negative electrode comprises pure aluminum metal or aluminum-rich alloys. The positive electrode includes at least one elemental chalcogen, and may include an alloy of chalcogen elements. In preferred embodiments, chalcogens are chosen from sulfur, selenium, tellurium, and combinations thereof. The electrolyte is a molten-salt forming mixture composed of aluminum trichloride, AlCl$_3$, and additional chloride salts chosen from the group consisting of alkali-metal chlorides. Preferred chloride salts include lithium chloride, sodium chloride, and potassium chloride. On a molar basis, the predominant chloride salt is aluminum trichloride. The battery is configured with appropriate insulation to operate at a temperature of between 90° C. and 250° C.

Definitions. As used in this description and the accompanying claims, the following terms shall have the meanings indicated, unless the context otherwise requires:

A "chalcogen" is a group 16 element, and includes sulfur, selenium and tellurium.

"EMIC" is 1-ethyl-3-methylimidazolium chloride, which is an ionic liquid at room temperature.

An "alkali chloride," also referred to as an alkali metal chloride, is a salt MCl formed from an alkali metal cation M$^+$ and a chloride anion Cl$^-$. Alkali metal cations M$^+$ are group 1 cations, and include Li$^+$, Na$^+$, K$^+$, Rb$^+$, Cs$^+$ and Fr$^+$.

"Aluminum trichloride" is a salt AlCl$_3$ formed from the aluminum cation, Al$^{3+}$, and three chloride anions Cl$^-$.

The charge rate "C/n" for a battery is a rate of charging that realizes a full charge C in n hours. For example, a charging rate of C/2 would realize a full charge in two hours, whereas a charging rate of 10 C would realize a full charge in 6 minutes.

The discharge rate "D/n" is the corresponding discharge rate that dissipates a full charge D in n hours.

Because they are capable of rapid cycling, aluminum metal batteries with cathodes based on anion intercalation of AlCl$_4^-$ into graphite have attracted some research interest. However, the concurrent consumption of electrolyte ions in such batteries lowers the overall energy density. Critically, such batteries have relied on combining AlCl$_3$ with room temperature ionic liquid electrolytes such as 1-ethyl-3-methylimidazolium chloride (EMIC), which are expensive, have sluggish charge-transfer kinetics and low ion-diffusivity. Embodiments of the instant invention defy the conventional wisdom favoring ambient temperature batteries and demonstrates that both high energy density and rapid charging can be achieved with aluminum-chalcogen chemistry in conjunction with low-cost molten-chloroaluminate electrolytes at moderately elevated temperature (in a preferred embodiment, between 90° C. and 120° C.). Significantly, battery embodiments of the invention are not prone to dendrite formation and the shorting and cell failure that follows therefrom.

Cell Configurations

Figure 1:
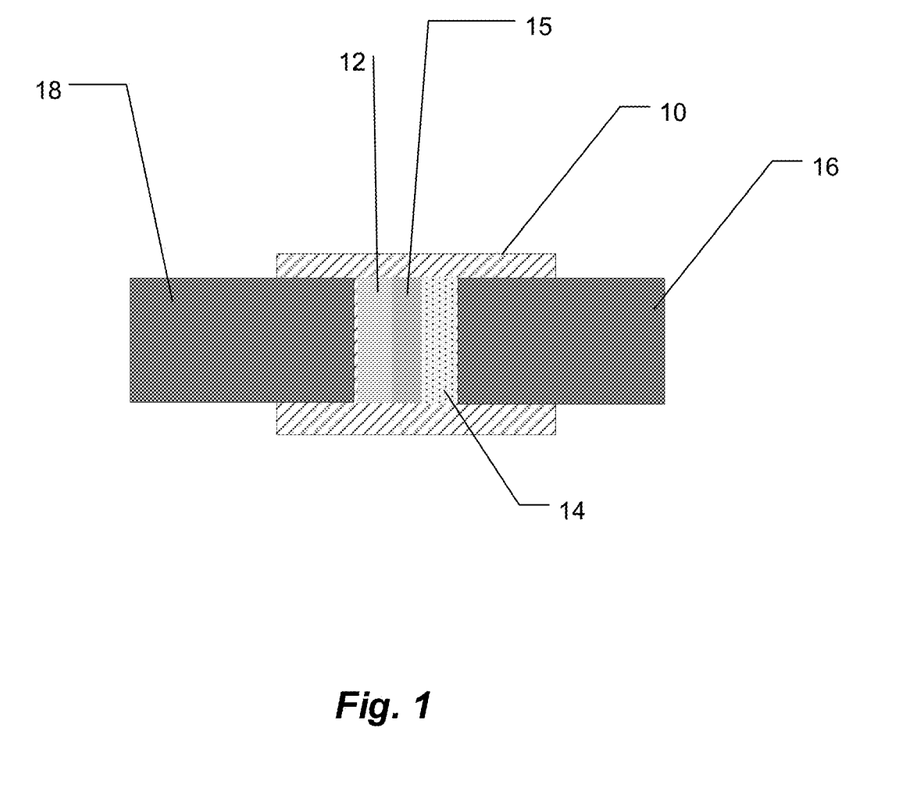
FIG. 1 embodies a battery according to the present invention for which the chalcogen in the positive electrode is a solid.
Figure 2:
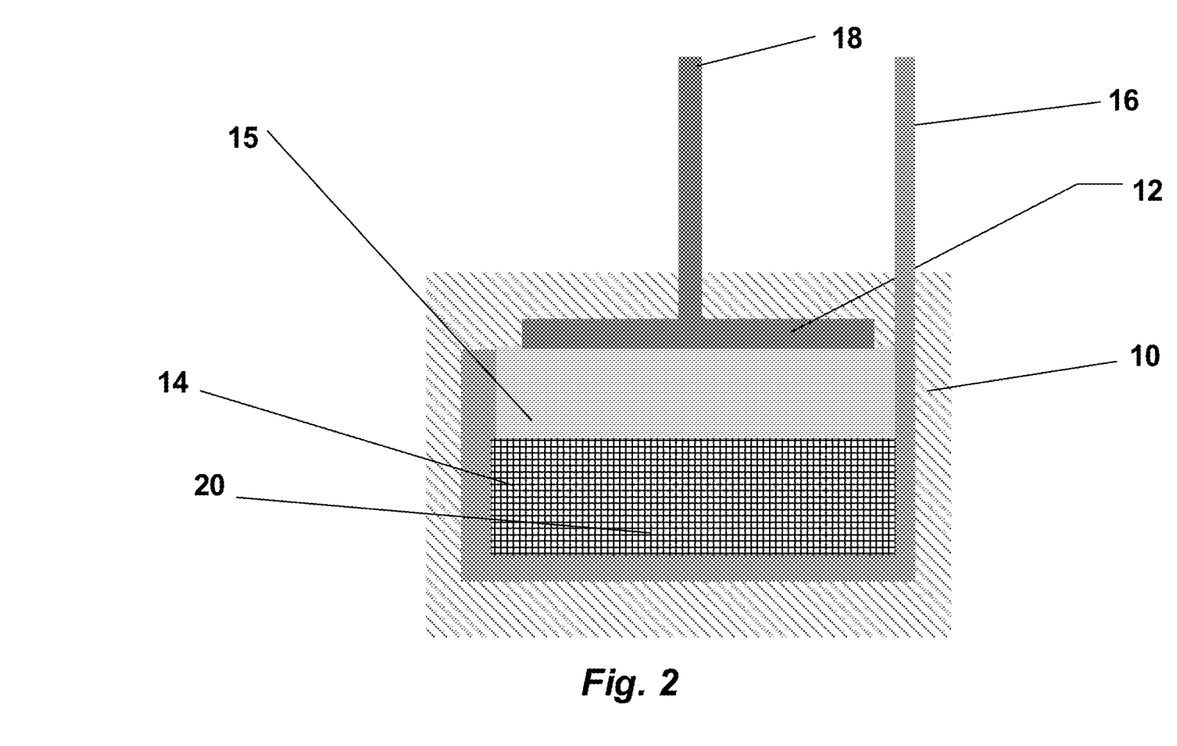
FIG. 2 embodies a battery according to the present invention for which the chalcogen in the positive electrode is a liquid.

FIGS. 1 and 2 embody two configurations of cells of the instant invention. In both configurations, the cell includes three active components: a negative electrode 12, a positive electrode 14, and a molten salt electrolyte 15.

The negative electrode 12, which can be, but is not limited to, foil or pelletized foil, comprises aluminum metal or an aluminum alloy. The aluminum alloy may incorporate metals which are less electropositive than aluminum, which will not undergo electrolysis during charge/discharge of the cell, and which will not adversely affect the faradaic reactions or significantly alter the potential of the negative electrode. Metals suitable for incorporation include zinc, tin, lead, bismuth, and antimony.

The positive electrode 14 includes one or more chalcogen elements, preferably sulfur, selenium or tellurium. The electrode functions by conversion of the chalcogen elements into chalcogenides in which the chalcogen has a valence state of −2. At an operating temperature of between 90° C. and 250° C., the chalcogen element can be a liquid or a solid. In some embodiments, the chalcogen is mixed with conductive additives, to create electronically conductive connections between the chalcogen electrode-active material and the electrode current collector. Suitable conductive additives include carbon and faradaically inactive metals such as molybdenum, tungsten, and titanium.

The electrolyte 15 is a salt mixture that includes aluminum trichloride ($AlCl_3$) at a molar percentage exceeding 50%, and one or more alkali metal chlorides (MCl). The electrolyte preferably forms a eutectic mixture having a melting point between 70° C. and 140° C. The salt mixture is formulated to ensure that the electrolyte 15 remains a liquid at the operating temperature of the cells illustrated in FIGS. 1 and 2 (i.e., between 90° C. and 250° C.). At the operating temperature the liquid electrolyte wets the positive and the negative electrodes 14, 15 and is chemically and electrochemically stable.

In the configuration illustrated in FIG. 1, a negative current collector 18 contacts the negative electrode 12, and a positive current collector 16 contacts the positive electrode 14. The electrolyte 15 contacts both the positive and negative electrodes 12, 14, ensuring that both positive and negative electrodes 12, 14 are wetted by the molten salt electrolyte 15 during normal operation of the cell. All of the positive and negative current collectors 16, 18, the negative and positive electrodes, 12, 14, and the electrolyte 15 are confined by a thermal insulator 10 which keeps air out of the cell, keeps the molten salt electrolyte 15 in the cell, and retains Joule heat generated by the cell. The characteristics of the insulator can be adjusted to set the operating temperature. According to an embodiment of the cell, the positive electrode 14 is made by a conventional approach of coating a slurry of chalcogen and polymeric binder onto the positive current collector 16. The current collectors 16, 18 can be free-standing carbon paper or foil of molybdenum, tungsten or titanium. The inner sheath of the cell, which must be an electrical insulator, can be made of glass, polymer, mineral, or any suitable dielectric materials. In a preferred embodiment, the cell is sealed in a metal container to prevent exposure to air.

In the second configuration, shown in FIG. 2, the battery is a beaker-type cell with three contiguous layers. At a bottom layer, the positive electrode 14 is liquid at the operating temperature and a mesh or foam conductive matrix 20 of carbon or faradaically inactive metals (e.g. Mo, W, or Ti) allows electricity to flow to a positive current collector 16. The top layer is a solid negative electrode 12 comprising a foil or other solid member of aluminum or its alloys. By virtue of being less dense than the positive electrode 14, the electrolyte 15 forms a middle layer on top of the positive electrode 14, spanning the space between the positive electrode 14 and the negative electrode 12, in intimate contact with both the positive electrode 14 and the negative electrode 12. In the configuration of FIG. 2, a thermal and electrical insulator 10 prevents direct contact between the positive current collector 16 and both of the negative electrode 12 and the negative current collector 18. The thermal and electrical insulator 10 also retains Joule heat generated by the cell, allowing it to maintain a modestly elevated temperature during normal operation without requiring external heating.

Cell Operation

Operation of cells according to embodiments of the invention occurs in two stages. During the startup stage, external heat is applied by an external heat source to melt a sufficient portion of the electrolyte so that current can flow through the cell. Flow of current results in Joule heating that melts the remaining electrolyte. During normal operation, the source of external heat is no longer required and may be deactivated. Current flow through the cell of the invention provides Joule heat that, with appropriate insulation, allows the cell to maintain normal operating temperature, without need for external heating.

EXAMPLES

Example 1: Preparation of Electrolytes

The inorganic chloroaluminates, $NaCl$—$AlCl_3$ and $NaCl$—$KCl$—$AlCl_3$ were prepared as eutectic mixtures according to ratios documented in phase diagrams. NaCl (99.99%, Sigma-Aldrich) and KCl (99.95%, Alfa Aesar) were dried in a muffle furnace for 72 hours prior to use. $AlCl_3$ (99.99%, Alfa Aesar) was used as received. The precursor powders were mixed in a specific molar ratio, $NaCl:AlCl_3$ (37:63) or $NaCl:KCl:AlCl_3$ (26:13:61), and heat soaked in a closed weighing bottle at 180° C. for 24 hours. The melt was cooled to room temperature, crushed, and ground into powder for battery assembly. The EMIC—$AlCl_3$ ionic liquid electrolyte at the optimal molar ratio of 1:1.3 as described in the literature was prepared by slowly adding $AlCl_3$ powder into 1-ethyl-3-methylimidazolium chloride (EMIC, >98%, TCI America) under rigorous stirring. The EMIC was baked in vacuo at 120° C. overnight before use. All preparations were performed inside a glovebox ($O_2$<0.1 ppm, $H_2O$<0.1 ppm).

Example 2: Preparation of Selenium Electrodes

In cells used for cycle testing (charge/discharge) and rate performance (FIGS. 5-7), the selenium-carbon composite for the positive electrode was synthesized by pyrolysis of the mixture of polyacrylonitrile (PAN) and selenium. The polyacrylonitrile (average $M_w$=150,000) powder was first mixed with selenium (99.999%, Alfa Aesar) at a 1:3 weight ratio by ball milling for 10 minutes. The mixture was then pelletized and loaded into a dry fused quartz tube, which was then evacuated and sealed for heat treatment at 600° C. for 3 hours (ramp rate=3° C./min, furnace cooling). The reactions on heating included dehydrogenation and cyclization of the polymer chain along with chemically bonded selenium, followed by carbonization of the matrix. The selenium in the composite exists as a crystalline phase (data not shown) and is homogeneously embedded in the carbon matrix. In order to reveal the capacity contribution of the carbon itself, selenium-free carbon material was prepared by the same pyrolysis method using polyacrylonitrile alone with no added selenium. Also, a simple selenium composite was also prepared by ball-milling selenium with Super P carbon (MTI Corp.) in a 70:30 weight ratio for 10 min (selenium weight fraction is 70%). To prepare the selenium electrodes, the respective selenium-carbon composite was mixed with Super P carbon, polytetrafluoroethylene (Sigma-Aldrich) at an 8:1:1 weight ratio by hand grinding. The slurry was made by stirring the mixture in 2-propanol (HPLC grade, Sigma-Aldrich). The electrodes were made by drop casting the slurry on P50 carbon papers (Fuel Cell Store) and dried at 90° C. in vacuo for 6 hours. The areal loading of selenium is 3.2-3.5 mg cm$^{-2}$.

Example 3: Preparation of Sulfur Electrodes

The sulfur composite was prepared by thermal diffusion. Sulfur (Alfa Aesar) and graphene (ACS Materials) were mixed (50:50, wt/wt) by grinding and then heat soaked at 155° C. for 12 hours to obtain the sulfur composite. The sulfur electrodes were prepared in the same way as the selenium electrode (sulfur:Super P:polytetrafluoroethylene=8:1:1 in 2-propanol), except that the electrodes were dried at 60° C. in vacuo for 6 hours. The areal loading of sulfur in a typical electrode is 1.5-2.0 mg cm$^{-2}$. Sulfur-free graphene electrodes were made in the same way to reveal graphene's contribution to the total capacity. High-loading electrodes (12.0 mg cm') were also prepared in the same way except that the electrodes were cold pressed under a 1-ton force before use. A Ketjen Black® (KB) sulfur electrode was also made by using a KB/S composite (prepared by thermal diffusion with 60 wt % of sulfur) with a sulfur loading of 2.0 mg cm'.

Example 4: Electrochemical Measurements

Figure 3:
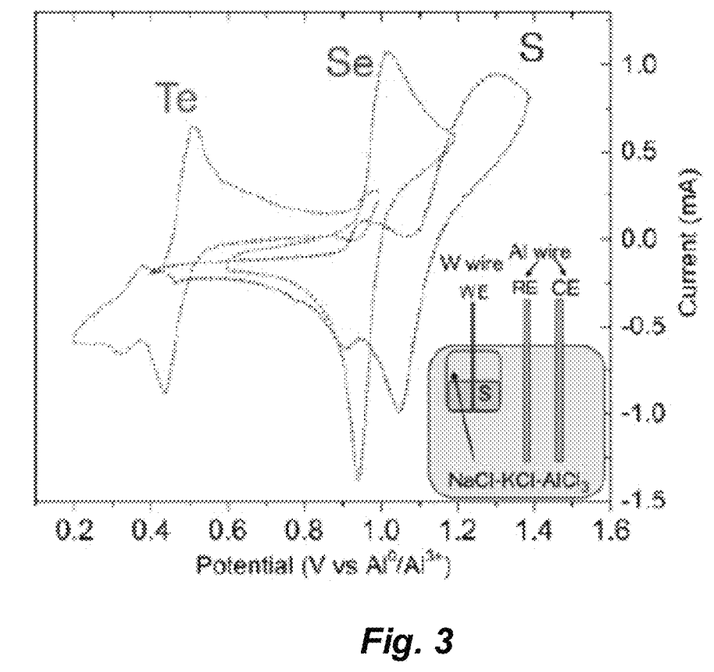
FIG. 3 shows cyclic voltammetry of three electrode beaker cells (see inset) of sulfur, selenium and tellurium in their pure states.

The cyclic voltammetry measurements were performed in a three-electrode beaker-type cell at 180° C. as schematically shown in the inset to FIG. 3. A tungsten crucible with an inner diameter of 20 mm contained the molten salt electrolyte (NaCl—KCl—AlCl$_3$). Two aluminum wires (99.99%, Ø1 mm, Alfa Aesar) were immersed in the electrolyte, one providing the counter electrode and one providing the reference electrode. For the aluminum plating study, a tungsten wire (99.9%, Ø1 mm, Alfa Aesar) served as the working electrode. For the sulfur study, molten sulfur contained in a separate fused quartz crucible which is submerged in the electrolyte served as the working electrode. For the studies of selenium and tellurium plating, the working electrodes were prepared by dipping the tungsten wire in a melt of selenium or tellurium, respectively. Solidified chalcogen coating the tungsten served as the active electrode. The functional surface areas of the three electrodes were thus approximately equal and similar to the geometric area of the tungsten wire. The CV scanning was performed with a Solartron EM® at a scanning rate of 10 mV s$^{-1}$.

Figure 5:
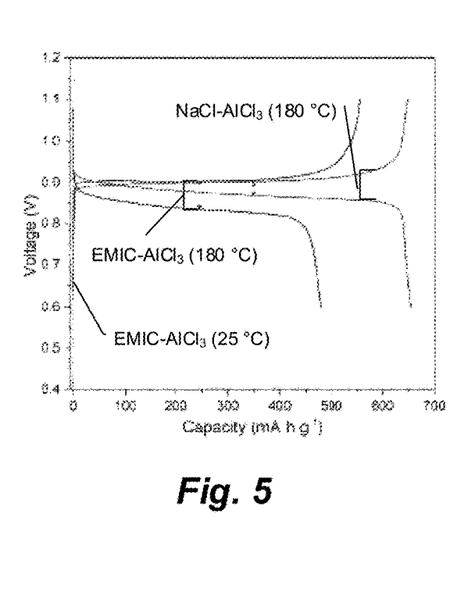
FIG. 5 compares the performance of Al/molten salt/Se cells to that of Al/ionic liquid/Se cells by displaying charge and discharge profiles.
Figure 6:
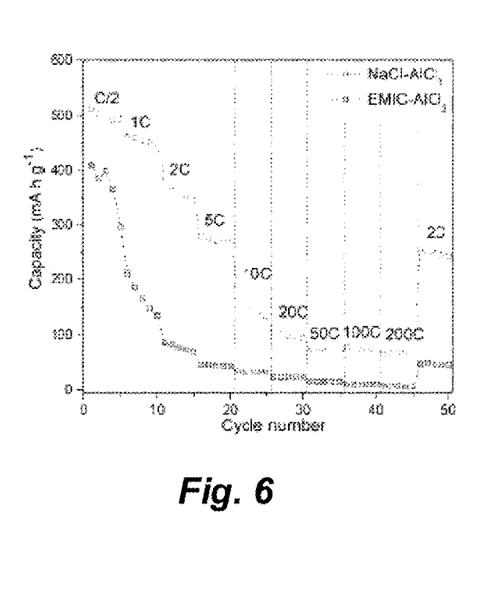
FIG. 6 shows the charging rate performance of Al—Se cells as a function of charging rate under a constant discharge rate (D/10) at 180° C. Here the charge rate, C/n, is represents full charge in n hours, while D/n is the corresponding discharge rate to full depth of discharge. The upper plots are for an Al/NaCl—AlCl$_3$ molten salt/Se cell, an embodiment of the instant invention. The lower plots are for an Al/EMIC—AlCl$_3$ ionic liquid/Se cell.
Figure 8:
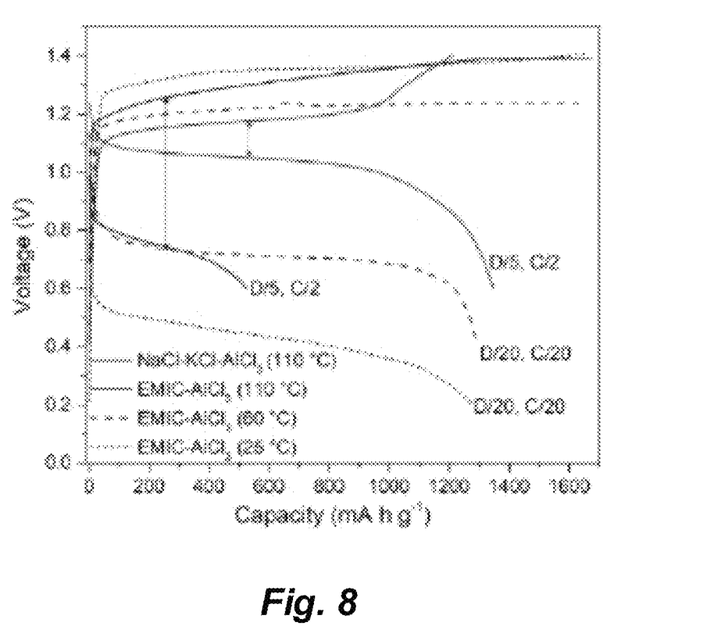
FIG. 8 compares the performance of Al/molten salt/S cells to that of Al/ionic liquid/S cells by displaying charge and discharge profiles.
Figure 10:
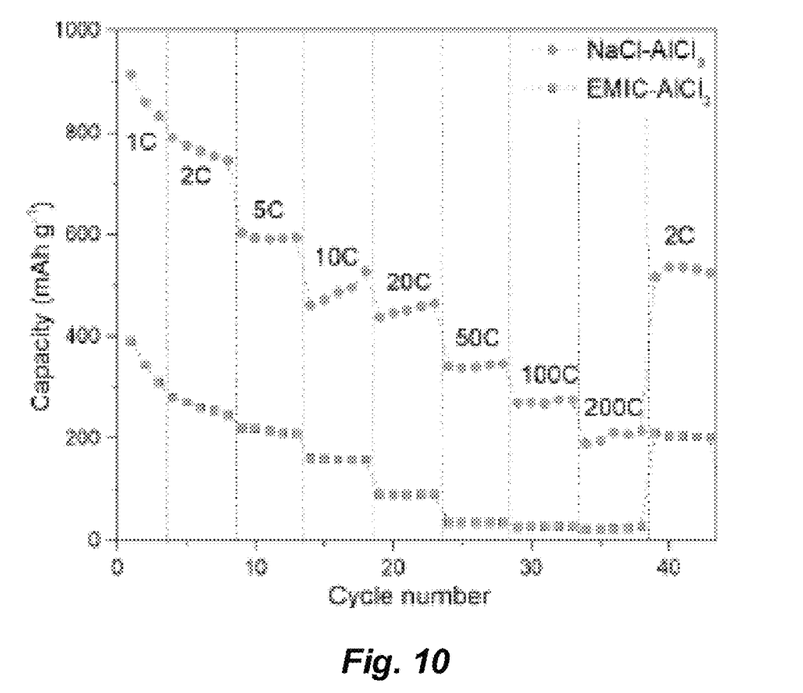
FIG. 10 shows charging rate performance of Al—S cells as a function of charging rate under a constant discharge rate (D/2) at 110° C. The upper plots are for an Al/NaCl—AlCl$_3$ molten salt/S cell, an embodiment of the instant invention. The lower plots are for an Al/EMIC—AlCl$_3$ ionic liquid/S cell.

Galvanostatic cycle testing was performed using in-house-designed Swagelok® cells. To prevent the corrosion of the stainless steel cell body by the chloroaluminate melts, a protective sheath was placed in the cell to contain the electrodes and electrolyte. Glass fiber membrane (GF-D, Whatman®) was used as the separator and aluminum foil (99.99%, Alfa Aesar) was used as the negative electrode. A stainless steel compression spring and a molybdenum foil spacer maintained the pressure. A molybdenum rod served as external current collector for both electrodes. An amount of 100 mg of NaCl—AlCl$_3$ or NaCl—KCl—AlCl$_3$ salt powder served as electrolyte in the Al—Se and Al—S cells, respectively. About 100 μL of the EMIC—AlCl$_3$ solution served as electrolyte in the ionic liquid cells. The cycling experiments were performed using an Arbin 2000T cycler. For clarity in describing the cycling rates that differ between charging and discharging, we use the notation 1 D (and 1 C) to denote a discharge (and charge) rate, which corresponds to full discharge (and charge) in one hour. The voltage-time traces shown in FIG. 5 and FIG. 8 are the initial cycle of the corresponding cells; the rate performances shown in FIG. 6 and FIG. 10 are after the initial conditioning cycle which was performed at D/10 and C/5 rates for selenium and D/2 and C/2 rates for sulfur. The rate measurements of Al—Se cells were conducted at a constant discharge rate of D/10 and a plurality of charge rates up to 200 C (1 C or 1D=678 mA h g$^{-1}$, for selenium) and the same protocol was used for sulfur except that the discharge rate is D/2 (1 C or 1D=1675 mA h g$^{-1}$, for sulfur). The discharge rate measurement for sulfur was performed at a constant charge rate of 1 C and a plurality of discharge rates up to 20D. The cycling stability measurements shown in FIGS. 12 and 13 were after a number of conditioning cycles that serve to achieve stabilized capacity. Specifically, the conditioning cycles were carried out by stepwise increasing charge rates from 1 C to the targeted rates, with 3 cycles at each step. The use of conditioning cycles according to this protocol is necessary to achieve stabilized capacity at high rates for Al—S chemistry.

Example 5: Exchange Current and Electrolyte Conductivity Measurements

The exchange currents of Al|Al and Al|Se cells were determined by linear sweep voltammetry (LSV) using the in-house-designed Swagelok® cells as described above. The Al|Al symmetric cells (aluminum foil as both electrodes) and Al|Se full cells (Se/carbon as positive electrode and Al foil as the negative electrode) were assembled using NaCl—KCl—AlCl$_3$ or EMIC—AlCl$_3$ electrolytes. LSV scans were performed from the open circuit voltage (OCV) down to −35 mV vs. OCV at a scanning rate of 10 mV s$^{-1}$. The thermodynamic studies were performed by running the cell at stepwise increasing temperatures, i.e., 110° C., 150° C., 180° C., 210° C., and 250° C. for the NaCl—KCl—AlCl$_3$ cell and 25° C., 60° C., 95° C., 110° C., 150° C., 180° C., 210° C., and 250° C. for the EMIC—AlCl$_3$ cell. A small range of voltage (35 mV) was used to avoid extensive progress of redox reactions and resistive surface layer buildup. The cells were conditioned at each temperature for one hour before measurements. At all temperatures measurements were performed on one cell (rather than multiple cells) to avoid errors arising from different cells. The exchange currents were extracted by linear fitting of the linear range of the Tafel plots derived from the LSV scan and using the intercept value with the OCV=0 axis. Three scans were performed at each temperature so as to obtain the average values and standard errors.

The exchange current measured on an electrochemical cell is dictated by the reaction of the more sluggish electrode. In the Al|Al symmetric cells, the two electrodes undergo the same Al plating/stripping processes. In the Al|Se cells, Al plating/stripping (same as that in the Al|Al cell) occurs at the negative electrode and selenium oxidation/reduction occurs at the positive electrode. Consequently, if one compares the exchange current of an Al|Al cell to that of an Al|Se cell with a fixed positive/negative capacity ratio, one can identify whether the rate limiting reaction is at the negative or positive electrode. For example, for the EMIC—AlCl$_3$ electrolyte, the exchange current of the Al|Se cell is 80% smaller than the Al|Al cell at 110° C., meaning that the selenium reaction limits the rate at 110° C.

To measure the ionic conductivity of the electrolytes, the electrochemical impedance spectrum (EIS) of an Al|Al cell was measured. The Nyquist plot at high frequency was fitted to a semicircle. The electrolyte resistance was found from the lower intercept with the real axis. The conductivity was calculated by use of a cell constant calibrated with the EMIC—AlCl$_3$ electrolyte at 25° C.

Example 6: Comparative Charge-Transfer Kinetics of Electrochemical Cells with Molten Salt and Ionic Liquid Electrolytes Owing to the formation of large covalent Al$_x$Cl$_{3x+1}^-$ polyanion clusters, the alkali-chloroaluminate melts (e.g., NaCl—KCl—AlCl$_3$) exhibit a much lower eutectic point (~90° C.) than other molten salt systems such as LiCl—NaCl—KCl (347° C.). This uniquely permits low-temperature operation of aluminum batteries. While chloroaluminate melts have been used for aluminum electroplating in the coating industry, they have rarely been used in rechargeable batteries and never with an elemental-chalcogen positive electrode. A eutectic mixture of NaCl—KCl—AlCl$_3$ (26:13:61, mol/mol) at 180° C. can support aluminum plating and stripping with low overpotential (~7 mV) and high coulombic efficiency (98.93%). As measured in a three-electrode beaker-type cell fitted with aluminum counter and reference electrodes (FIG. 3), the chalcogen electrodes (S, Se, Te) show stable bidirectional redox chemistry with the primary cathodic peaks at 1.05 V, 0.93 V, 0.45 V, respectively, consistent with values calculated from the free energy change assuming conversion to aluminum chalcogenide, Al$_2$Ch$_3$ (1.09 V, 0.96 V, 0.57 V, Ch=chalcogen).

Figure 4:
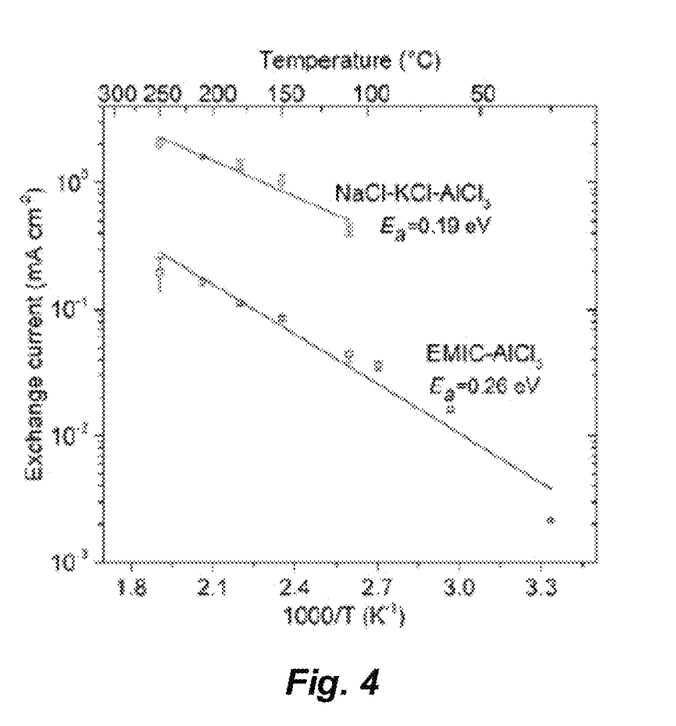
FIG. 4 shows Arrhenius plots comparing the charge-transfer kinetics of Al/Al symmetric cells fitted with a molten salt electrolyte to those of Al/Al symmetric cells fitted with an ionic liquid electrolyte.

As shown in FIG. 4, the charge-transfer kinetics in two different electrolyte systems, one an ionic liquid and one a molten salt, are quantified by measuring the exchange current, $I_o$, of Al|Al symmetric cells in which the cathodic and anodic reactions are aluminum plating/stripping. In the ionic liquid electrolyte (EMIC—AlCl$_3$, 1:1.3) the variation of $I_o$ with temperature exhibits Arrhenius behavior with an activation energy of 0.26 eV. Increasing the temperature from 25° C. to 110° C. and 180° C. gives a 25- and 65-fold increase in $I_o$, respectively. Impressively, compared to EMIC—AlCl$_3$ the NaCl—KCl—AlCl$_3$ melt supports about one order of magnitude higher $I_o$ with a lower activation energy of 0.19 eV. This result indicates much faster charge-transfer kinetics at the electrified interface for the melt—more specifically, faster Al$^{3+}$ desolvation—which is foundational for high rate-capability in a battery. The higher rate-capability in the molten salt cannot be attributed to more rapid mass transport, as the ionic conductivities of the two electrolytes differ only slightly from one another, both with much lower values of activation energy than those of $I_o$ (0.07-0.10 eV compared to 0.19-0.26 eV).

Example 7: Electrochemical Performance of Al—Se Battery

The performance of selenium opposite aluminum was examined in a Swagelok® cell made in-house. A crystalline selenium composite prepared as described above by pyrolysis of a polyacrylonitrile/selenium mixture served as the positive electrode. "C/n" is used to denote a charging rate that realizes a full charge in n hours, while "D/n" denotes a discharging rate of same magnitude. As shown in FIG. 5, the discharge reaction between electrodes of selenium and aluminum in molten NaCl—AlCl$_3$ proceeds along a rather flat voltage-time trace at 180° C. (average 0.88 V), yielding a capacity of 655 mA h g$^{-1}$ at D/5. The polarization is as small as 30 mV resulting in a high roundtrip energy efficiency (96.5%). The cell with ionic liquid EMIC—AlCl$_3$ at 180° C. exhibits about twice the polarization (70 mV) of the cell with molten NaCl—AlCl$_3$. As is also shown in FIG. 5, at room temperature the EMIC—AlCl$_3$ cells operate with much higher polarization and deliver much lower capacity. The cell using molten NaCl—AlCl$_3$ shows good cycling stability, sustaining 300 mA h g$^{-1}$ and no voltage decay over 50 cycles at rates of D/5, C/2 (data not shown). We also observe similar stability for a cell fitted with a milled commercial selenium positive electrode (data not shown).

Mimicking the practical requirements of a commercially viable battery, FIG. 6 shows the rate capability of Al—Se cells for charging rates varying from C/2 to 200 C while discharging at a fixed D/10 rate. The Al—Se cell with molten NaCl—AlCl$_3$ electrolyte has a reversible capacity of 520 mA h g$^{-1}$ at a charging rate of C/2, and maintains a capacity of 190 mA h g$^{-1}$ at 10 C. When the charging rate is increased by a factor of 400 from C/2 to 200 C, the cell still retains 75 mA h g$^{-1}$ capacity. Significantly, this is not an ion-adsorption capacitive behavior, because both charge and discharge show well-defined plateau-like time traces and differential-capacity curves. Only a marginal fraction of the capacity in the applied-voltage window comes from the carbon (data not shown). By contrast, the Al—Se cell with EMIC—AlCl$_3$ ionic liquid electrolyte shows close to zero capacity at charging rates exceeding 10 C.

Figure 7:
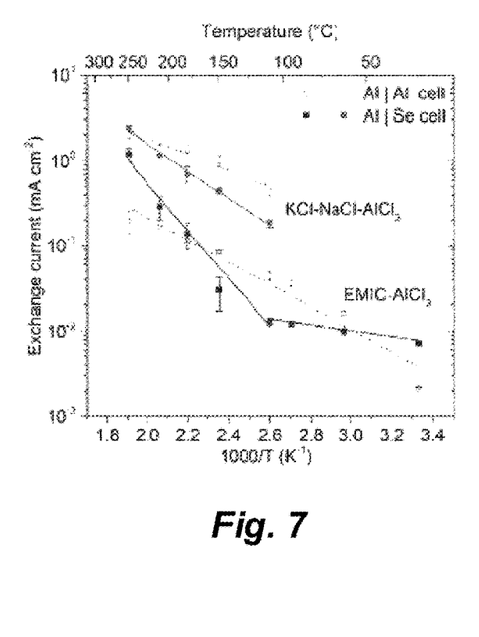
FIG. 7 shows Arrhenius plots comparing the charge transfer kinetics of Al/molten salt/Al cells to those of Al/molten salt/Se cells, and Al/ionic liquid/Al cells to Al/ionic liquid/Se cells.

To elucidate whether the reaction on the positive or negative electrode is rate limiting, we measured the exchange current of Al|ionic liquid|Se and Al|molten salt|Se cells and compared the value to that of Al|Al symmetric cells. As shown in FIG. 7, the $I_o$ of the Al|ionic liquid|Se cell utilizing EMIC—AlCl$_3$ as an electrolyte does not follow a monotonic Arrhenius trend; instead, a significant increase in $I_o$ occurs only above 150° C., suggesting a transition in selenium reaction pathway at this temperature. Based on comparing the $I_o$ values of Al|Se cells to those of Al|Al cells, the selenium reaction on the positive electrode is always rate determining for the Al|molten salt|Se cell utilizing NaCl—KCl—AlCl$_3$ as an electrolyte, whereas the Al|ionic liquid|Se cell utilizing EMIC—AlCl$_3$ as an electrolyte is limited by the aluminum electrode above 150° C.

In terms of charge capacity and ability to rapidly charge, the electrochemical performance of the tested Al|molten salt|Se cell is demonstrably superior to that of Al|ionic liquid|Se cells.

Example 8: Electrochemical Performance of Al|Molten Salt|S Battery

FIGS. 8-13 characterize the electrochemical performance of a lower-cost, higher-capacity, Al|molten salt|S battery, which operates at 110° C. thanks to an electrolyte consisting of NaCl—KCl—AlCl$_3$ which has a eutectic at ~93° C. In FIG. 8, sulfur shows a flat voltage-time trace averaging 1.05 V and initial capacity reaching 1,350 mA h g$^{-1}$ at D/5 (theoretical: 1,675 mA h g$^{-1}$). The polarization is as low as 50 mV which is in sharp contrast to that measured for an Al|ionic liquid|S battery utilizing an electrolyte of EMIC—AlCl$_3$: 450 mV at 25° C. (D/20), 250 mV at 60° C. (D/20) and 205 mV at 110° C. (D/5). Furthermore, the Al|ionic liquid|S cell experiences extensive overcharge and very low sulfur utilization at all temperatures (e.g., 525 mA h g$^{-1}$ at 110° C.), indicating that there is significant dissolution of intermediate species in the electrolyte.

Figure 9:
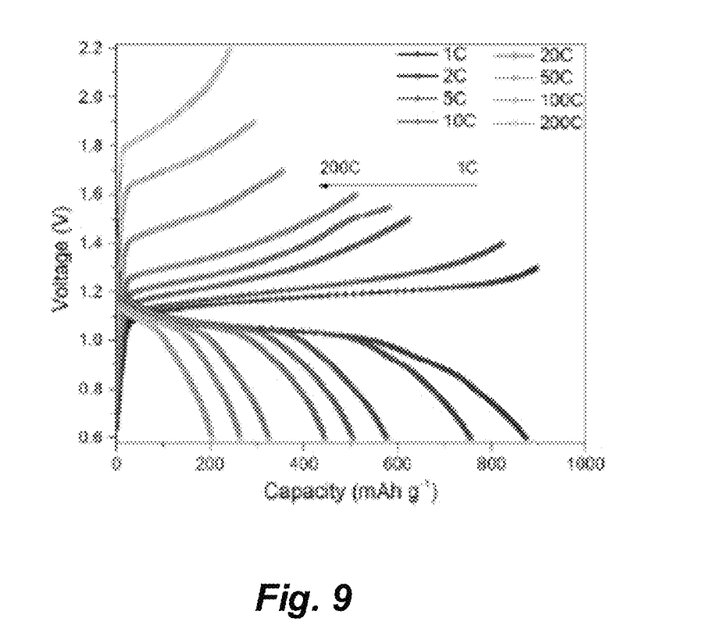
FIG. 9 compares voltage/capacity profiles for different charging rates for Al—S cells with molten salt electrolytes.

As shown in FIGS. 9 and 10, with a constant discharge rate of D/2, the Al—S cell with NaCl—KCl—AlCl$_3$ as electrolyte exhibits a high capacity of 500 mA h g$^{-1}$ at a charging rate of 10 C, which slightly decreases to 430 and 360 mA h g$^{-1}$ at 20 C and 50 C, respectively. Even at extreme charging rates of 100 C and 200 C, the cell still shows high capacity of 280 and 210 mA h g$^{-1}$, respectively. As shown in FIG. 9, at all charging rates, the cell shows well-defined, non-capacitive voltage-time traces. In contrast, the cell fitted with EMIC—AlCl$_3$ shows close to zero capacity at 50 C and higher. The ultrafast charging capability in NaCl—KCl—AlCl$_3$ is not unique to a particular carbon host material (data not shown).

Figure 11:
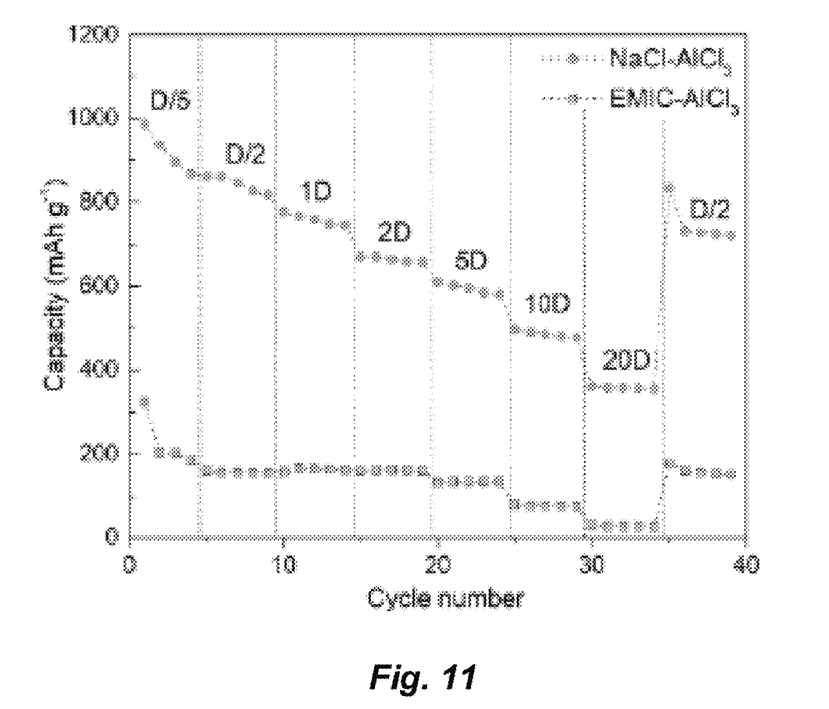
FIG. 11 shows discharging rate performance of Al—S cells as a function of discharging rate for a constant charge rate (C/2) at 110° C. The upper plots are for an Al/NaCl—AlCl$_3$ molten salt/S cell, an embodiment of the instant invention. The lower plots are for an Al/EMIC—AlCl$_3$ ionic liquid/S cell.
Figure 12:
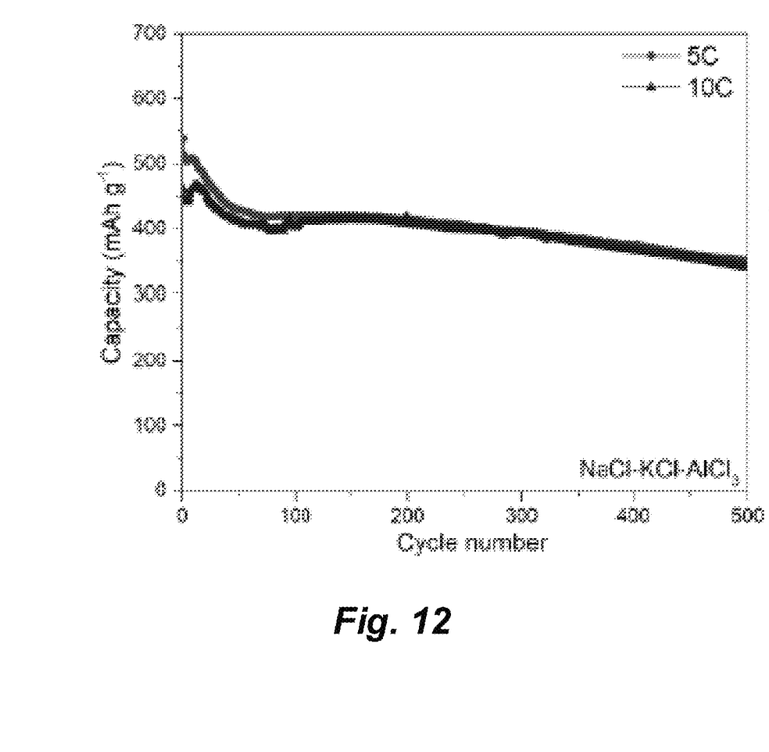
FIG. 12 shows discharge capacity of Al/NaCl—KCl—AlCl$_3$ molten salt/S cells, embodiments of the instant invention, as a function of cycle number for charging rates of 5 C and 10 C under a constant discharge rate (D/2) at 110° C.
Figure 13:
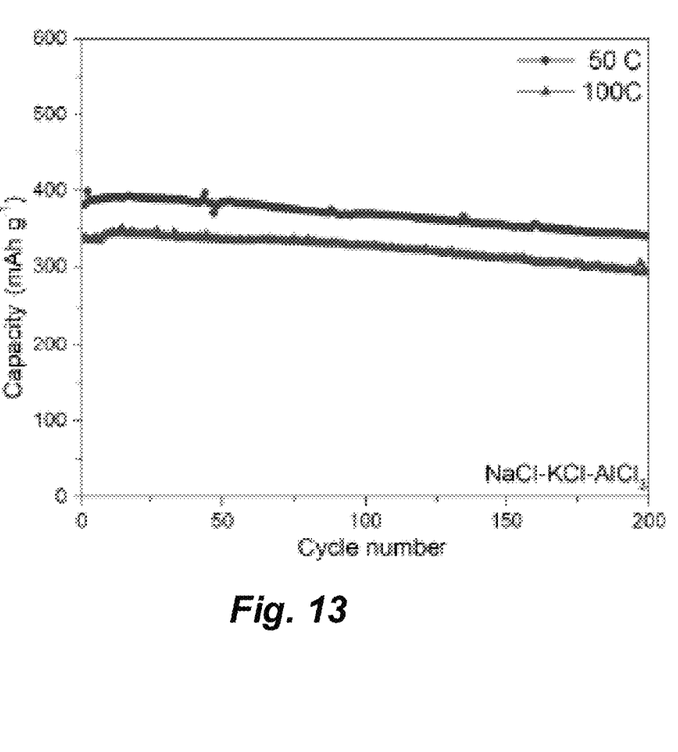
FIG. 13 shows discharge capacity of Al/NaCl—KCl—AlCl$_3$ molten salt/S cells, embodiments of the instant invention, as a function of cycle number for charging rates of 50 C and 100 C under a constant discharge rate (D/2) at 110° C.

After a number of conditioning cycles following protocols described above, the cells can sustain hundreds of cycles at high charging rates of 5-10 C, and ultrahigh rates of 50-100 C (FIGS. 12, 13). The Al—S chemistry also shows good fast-discharging capability: 670 and 360 mA h g$^{-1}$, respectively, at 2D and 20D (FIG. 11).

The discrepancy between the demonstrated charging and discharging rate capability is due to asymmetry in the Al$^{3+}$ solvation and Al$^{3+}$ desolvation processes, this asymmetry being attributable to the molecular structure of the AlCl$_3$-rich chloroaluminate melt, which is very acidic in the Lewis sense. As a consequence, it is kinetically more favorable to exsolve AlCl$_3$ than to dissolve it. When the cell discharges, the less favored Al$^{3+}$ solvation (accompanied by AlCl$_3$ dissolution) occurs at the planar Al negative electrode which carries a much higher local current density than does the powdered sulfur electrode with its higher surface area. This means that on discharge the reaction at the negative electrode is rate-limiting. On charge, it is the kinetics of Al$^{3+}$ deposition that are favored; hence, in spite of the difference in electrode surface areas, higher rate-capability is attainable on charge than on discharge. Importantly, in the Al—S cell even after cycling at high charging rates there is no evidence of dendrite growth on the Al negative electrode which could lead to shorting of the cell. Without being bound by a particular theory, it is hypothesized that dendrite formation is disabled thanks to the presence of trace amounts of (poly)sulfide anions in the vicinity of the Al electrode surface. Polysulfide acts as a levelling agent to regulate the current flux distribution over the expanse of the electrode, as has been reported for urea, β-naphthylamine, and tetramethylammonium chloride. Also, the high acidity of the melt with its attendant higher-order chloroaluminate moieties (Al$_2$Cl$_7^-$, Al$_3$Cl$_{10}^-$, etc.) sets a high threshold current for dendrite proliferation.

Cost and Energy Density Compared with Competing Battery Technologies

Figure 14:
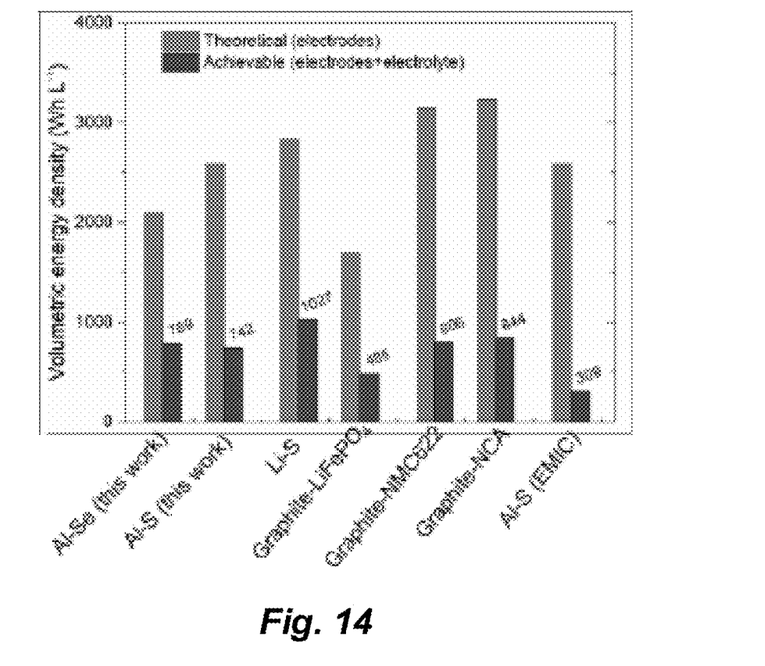
FIG. 14 compares the theoretical and currently achievable energy densities of aluminum chalcogen batteries of embodiments of the instant invention with those of contemporary battery systems.

The volumetric energy densities of the cells of embodiments of the instant invention are compared with those of competing technologies in FIG. 14. Materials costs are compared in FIG. 15. In terms of energy densities, the Al—S cells of the instant invention are competitive in both practical and theoretical terms. In terms of materials costs, the Al—S cells are orders of magnitude cheaper than the competing technologies.

Our electrochemical data show the Al|NaCl—KCl—AlCl$_3$|S battery can achieve an energy density of 742 Wh L$^{-1}$, comparable to that of graphite-NMC622 (LiNi$_{0.6}$Mn$_{0.2}$Co$_{0.2}$O$_2$) lithium-ion batteries and Li—S batteries (FIG. 14). Moreover, the sulfur electrodes described herein can, with high loading of 12 mg cm$^{-2}$, sustain a high capacity of 520 mA h g$^{-1}$ over 100 cycles.

Figure 15:
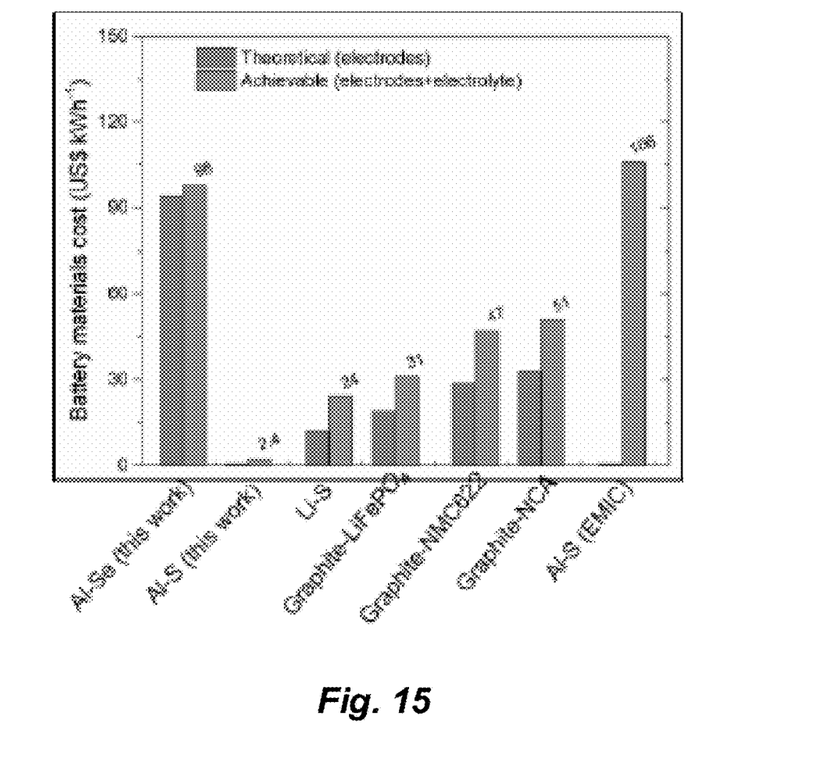
FIG. 15 compares the theoretical and currently achievable battery materials costs of aluminum chalcogen batteries of embodiments of the instant invention with those of contemporary battery systems.

Importantly, aluminum-sulfur batteries according to embodiments of the instant invention have two major economic advantages. First, given the high earth-abundance of all components: aluminum, sulfur, NaCl, KCl, and AlCl$_3$, the achievable materials cost of the Al—S battery, including electrode-active materials and electrolyte, is as low as USD$2/kWh, which is less than 5% that of today's Li-ion batteries at the cell level (FIG. 15). Moreover, the use of low-grade aluminum (e.g., food-packaging foil) in the negative electrode does not result in appreciable deterioration in cell performance. This allows batteries to be constructed from commercial-grade metal as produced by today's aluminum industry. Secondly, with an operating temperature at around the boiling point of water, the battery will not require an active cooling system—in distinct contrast to the situation for lithium-ion batteries in large format, for which such an active cooling system is absolutely critical. Instead, the moderately elevated operating temperature can be maintained by a combination of internal Joule heating generated while cycling and proper thermal insulation. Because the molten salt electrolyte is involatile over the range of operating temperatures, and not flammable, the Al—S battery is inherently safer than conventional lithium-ion batteries. The immunity to thermal runaway and fire makes the Al—S battery especially attractive for electric vehicles.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A rechargeable aluminum-chalcogen battery comprising:
    an aluminum or aluminum alloy negative electrode;
    a positive electrode comprising a sulfur composite comprising elemental sulfur having an oxidation state of zero;
    an electrolyte comprising a salt mixture of AlCl$_3$ and MCl, wherein MCl is an alkali chloride, and M is selected from the group consisting of lithium, sodium, potassium, rubidium, and cesium and combinations thereof, the electrolyte configured to form a molten salt that physically contacts and wets the positive electrode and the negative electrode during operation of the aluminum-chalcogen battery;
    a negative current collector in electrical contact with the negative electrode; and
    a positive current collector in electrical contact with the positive electrode;
    wherein:
        the sulfur composite is formed by grinding and heat soaking a mixture of sulfur and at least one of graphene or carbon black;
        the sulfur is present in the sulfur composite at an areal loading of about 1.5 mg cm$^{-2}$ to about 2.0 mg cm$^{-2}$;
        the molar concentration of AlCl$_3$ in the salt mixture is at least 50%; and
        the melting temperature of the salt mixture is between 70° C. and 140° C.

2. The aluminum-chalcogen battery of claim 1, further comprising thermally insulating material configured to retain Joule heat generated by the battery in order to maintain an operating temperature of about 90° C. to about 250° C. without external heating;
    wherein the thermally insulating material comprises at least one of glass, polymer, mineral, or dielectric material.

3. The aluminum-chalcogen battery of claim 1, wherein the salt mixture includes between 60% and 95% $AlCl_3$ on a per molar basis.

4. The aluminum-chalcogen battery of claim 1, wherein the salt mixture includes between 80% and 95% $AlCl_3$ on a per molar basis.

5. The aluminum-chalcogen battery of claim 2, configured for operation at a temperature between about 90° C. and about 180° C.

6. The aluminum-chalcogen battery of claim 2, configured for operation at a temperature between about 90° C. and about 150° C.

7. The aluminum-chalcogen battery of claim 2, configured for operation at a temperature between about 90° C. and about 120° C.

8. The aluminum-chalcogen battery of claim 1, wherein during battery operation the elemental sulfur is present as a liquid.

9. The aluminum-chalcogen battery of claim 1, wherein during battery operation the elemental sulfur is present as a solid.

10. The aluminum-chalcogen battery of claim 1, wherein the positive electrode further comprises selenium.

11. The aluminum-chalcogen battery of claim 1, wherein the positive current collector comprises a conductive matrix in contact with the elemental sulfur.

12. The aluminum-chalcogen battery of claim 1, wherein the sulfur composite is coated as a polymer-containing slurry onto the positive electrode.

13. The aluminum-chalcogen battery of claim 1, wherein the eutectic mixture includes, on a molar basis, between 60% and 90% $AlCl_3$, between 0% and 30% NaCl and between 0% and 20% KCl.

14. A method for generating electric current comprising:
providing a rechargeable aluminum-chalcogen battery, wherein the battery comprises:
an aluminum or aluminum alloy negative electrode;
a positive electrode comprising elemental chalcogen having an oxidation state of zero, selected from the group consisting of sulfur, selenium, tellurium, and combinations thereof;
an electrolyte comprising a salt mixture of $AlCl_3$ and MCl, wherein MCl is an alkali chloride, and M is selected from the group consisting of lithium, sodium, potassium, rubidium, and cesium and combinations thereof, the electrolyte configured to form a molten salt that physically contacts and wets the positive electrode and the negative electrode during operation of the aluminum-chalcogen battery;
a negative current collector in electrical contact with the negative electrode; and
a positive current collector in electrical contact with the positive electrode;
wherein the molar concentration of $AlCl_3$ in the eutectic mixture is at least 50%, and wherein the melting temperature of the salt mixture is between 70° C. and 140° C.;
connecting the positive current collector and the negative current collector to an external circuit;
applying an external heat source to melt a portion of the electrolyte;
deactivating the external heat source;
discharging the aluminum-chalcogen battery through the external circuit; and
allowing Joule heating generated during discharging to melt the remaining electrolyte and to maintain the electrolyte in a molten state without further external heating.

15. The method of claim 14, wherein, during discharging, the aluminum-chalcogen battery has a discharge rate of about D/2 and exhibits a capacity of about 500 mA h $g^{-1}$.

16. The method of claim 14, further comprising charging the aluminum-chalcogen battery at a charge rate of about 50 C to about 200 C with a capacity of about 210 mA h $g^{-1}$ to about 360 mA h $g^{-1}$.

17. A rechargeable aluminum-chalcogen battery comprising:
a negative electrode in the solid state comprising aluminum or aluminum alloy;
a positive electrode comprising:
elemental chalcogen in a liquid state having an oxidation state of zero, selected from the group consisting of sulfur, selenium, tellurium, and combinations thereof; and
a conductive matrix comprising at least one of carbon, molybdenum, tungsten, or titanium;
an electrolyte disposed on the positive electrode and in electrical contact with the negative electrode, the electrolyte comprising a salt mixture of $AlCl_3$ and MCl in the liquid state having a density less than the elemental chalcogen, wherein M is selected from the group consisting of lithium, sodium, potassium, rubidium, and cesium and combinations thereof;
a negative current collector in electrical contact with the negative electrode;
a positive current collector configured to hold the positive electrode and the electrolyte in the liquid state, the positive current collector in electrical contact with the positive electrode.

18. The rechargeable aluminum-chalcogen battery of claim 17, wherein the salt mixture includes between 60% and 95% $AlCl_3$ on a per molar basis.

19. The rechargeable aluminum-chalcogen battery of claim 18, wherein the salt mixture includes between 80% and 95% $AlCl_3$ on a per molar basis.

* * * * *